(12) United States Patent
Boden et al.

(10) Patent No.: US 9,790,410 B2
(45) Date of Patent: Oct. 17, 2017

(54) METHOD OF MAKING CERAMIC SHAPED ABRASIVE PARTICLES, SOL-GEL COMPOSITION, AND CERAMIC SHAPED ABRASIVE PARTICLES

(75) Inventors: John T. Boden, White Bear Lake, MN (US); Scott R. Culler, Burnsville, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 403 days.

(21) Appl. No.: 14/127,853

(22) PCT Filed: Jun. 28, 2012

(86) PCT No.: PCT/US2012/044605
§ 371 (c)(1),
(2), (4) Date: Dec. 19, 2013

(87) PCT Pub. No.: WO2013/009484
PCT Pub. Date: Jan. 17, 2013

(65) Prior Publication Data
US 2014/0109490 A1  Apr. 24, 2014

Related U.S. Application Data

(66) Substitute for application No. 61/506,913, filed on Jul. 12, 2011.
(Continued)

(51) Int. Cl.
*C09K 3/14* (2006.01)
*B24D 18/00* (2006.01)
(Continued)

(52) U.S. Cl.
CPC .......... *C09K 3/1409* (2013.01); *B24D 18/009* (2013.01); *B28B 1/004* (2013.01);
(Continued)

(58) Field of Classification Search
CPC ....... C04B 35/634; C04B 35/00; C04B 35/10; C04B 35/624; C04B 35/632;
(Continued)

(56) References Cited

U.S. PATENT DOCUMENTS

| 1,910,444 A | 5/1933 | Nicholson |
| 3,041,156 A | 6/1962 | Rowse |

(Continued)

FOREIGN PATENT DOCUMENTS

| CA | 743715 | 10/1966 |
| CN | 101909823 A | 12/2010 |

(Continued)

OTHER PUBLICATIONS

International Search Report for PCT International Application No. PCT/US2012/044605, mailed on Feb. 13, 2013, 6 pgs.
(Continued)

*Primary Examiner* — Jennifer A Smith
*Assistant Examiner* — Alexandra M Moore
(74) *Attorney, Agent, or Firm* — Bradford B. Wright

(57) ABSTRACT

A method includes: providing a mold having a plurality of mold cavities, wherein each mold cavity is bounded by a plurality of faces joined along common edges; filling at least some of the mold cavities with a sol-gel composition that includes a release agent dispersed therein; at least partially drying the sol-gel composition thereby forming shaped ceramic precursor particles; calcining at least a portion of the shaped ceramic precursor particles to provide calcined shaped ceramic precursor particles; and sintering at least a portion of the calcined shaped ceramic precursor particles to provide ceramic shaped abrasive particles. A sol-gel composition, shaped ceramic precursor particles, and ceramic shaped abrasive particles associated with practice of the method are also disclosed.

6 Claims, 3 Drawing Sheets

Related U.S. Application Data

(60) Provisional application No. 61/508,190, filed on Jul. 15, 2011.

(51) Int. Cl.

| | | |
|---|---|---|
| *C04B 35/10* | (2006.01) | |
| *C04B 35/624* | (2006.01) | |
| *B29C 33/58* | (2006.01) | |
| *C04B 35/632* | (2006.01) | |
| *B28B 1/00* | (2006.01) | |
| *B28B 1/14* | (2006.01) | |
| *B24D 3/00* | (2006.01) | |
| *B24D 3/14* | (2006.01) | |

(52) U.S. Cl.
CPC ............ B28B 1/14 (2013.01); B29C 33/58 (2013.01); C04B 35/10 (2013.01); C04B 35/624 (2013.01); C04B 35/632 (2013.01); B24D 3/00 (2013.01); B24D 3/14 (2013.01); B24D 18/00 (2013.01); C04B 2235/5427 (2013.01); C04B 2235/602 (2013.01); C04B 2235/6027 (2013.01); C04B 2235/6567 (2013.01); C04B 2235/77 (2013.01); C04B 2235/94 (2013.01)

(58) Field of Classification Search
CPC ...... C04B 2235/5427; C04B 2235/602; C04B 2235/6027; C04B 2235/6567; C04B 2235/77; C04B 2235/94; C09G 1/00; C09G 1/02; C09K 3/00; C09K 3/14; C09K 3/1436; C09K 3/1463; C09K 3/1409; B28B 1/00; B28B 1/004; B28B 1/14; B29C 33/00; B29C 33/58
USPC .......................................................... 51/308
See application file for complete search history.

(56) References Cited

U.S. PATENT DOCUMENTS

| | | |
|---|---|---|
| 3,859,407 A | 1/1975 | Blanding |
| 4,314,827 A | 2/1982 | Leitheiser |
| 4,744,802 A | 5/1988 | Schwabel |
| 4,799,939 A | 1/1989 | Bloecher |
| 4,997,461 A | 3/1991 | Markhoff-Matheny |
| 5,009,675 A | 4/1991 | Kunz |
| 5,011,508 A | 4/1991 | Wald |
| 5,042,991 A | 8/1991 | Kunz |
| 5,078,753 A | 1/1992 | Broberg |
| 5,085,671 A | 2/1992 | Martin |
| 5,152,917 A | 10/1992 | Pieper |
| 5,164,348 A | 11/1992 | Wood |
| 5,201,916 A | 4/1993 | Berg |
| 5,213,591 A | 5/1993 | Celikkaya |
| 5,366,523 A | 11/1994 | Rowenhorst |
| 5,435,816 A | 7/1995 | Spurgeon |
| 5,551,963 A | 9/1996 | Larmie |
| 5,645,619 A | 7/1997 | Erickson |
| 5,672,097 A | 9/1997 | Hoopman |
| 5,946,991 A | 9/1999 | Hoopman |
| 5,975,987 A | 11/1999 | Hoopman |
| 6,054,093 A | 4/2000 | Torre, Jr. |
| 6,129,540 A | 10/2000 | Hoopman |
| 6,228,340 B1 | 5/2001 | Imhof |
| 6,277,161 B1 | 8/2001 | Castro |
| 6,391,072 B1 | 5/2002 | Garg |
| 8,113,913 B2 | 2/2012 | Pietsch |
| 2006/0175740 A1 | 8/2006 | Denq |
| 2008/0170656 A1 | 7/2008 | Jiang |
| 2009/0165394 A1 | 7/2009 | Culler |
| 2010/0146867 A1 | 6/2010 | Boden |
| 2010/0151195 A1 | 6/2010 | Culler |
| 2010/0151196 A1 | 6/2010 | Adefris |
| 2010/0151201 A1 | 6/2010 | Erickson |
| 2010/0266847 A1 | 10/2010 | Wickert |
| 2010/0319269 A1 | 12/2010 | Erickson |
| 2011/0009032 A1 | 1/2011 | Vaughan |
| 2011/0092363 A1 | 4/2011 | Seo |

FOREIGN PATENT DOCUMENTS

| | | |
|---|---|---|
| EP | 0767154 | 4/1997 |
| GB | 986847 | 3/1965 |
| GB | 2417921 | 3/2006 |
| JP | S49-23395 A | 3/1974 |
| JP | S55-48576 A | 4/1980 |
| JP | 2002-361562 A | 12/2002 |
| JP | 2013-512788 T | 4/2013 |
| JP | 2012-512047 T | 5/2015 |
| WO | WO 93/25385 | 12/1993 |
| WO | WO 99/38817 | 8/1999 |
| WO | WO 2006027593 A2 | 3/2006 |
| WO | WO 2010/077519 | 7/2010 |

OTHER PUBLICATIONS

Li, "Large area direct nanoimprinting of $SiO_2$—$TiO_2$ gel gratings for optical applications", Journal of Vacuum Science &Technology B, Mar. 2003, vol. 21, No. 2, pp. 660-663.

Saint-Gobain, "Investigation of Shaped-Abrasive-Particles vol. 1: Review of U.S. Pat. No. 6,054,093 Apr. 25, 2000", Apr. 2011, 5 pgs.

Westerheide, "Finite Element Simulation of Die Pressing and Sintering Results in Time and Cost Savings", CFI. Ceramic forum international, Apr. 1998, vol. 75, No. 4, pp. 31-34.

Li et al, Large are direct nanoimprinting of SiO2—TiO2 gel gratings for optical applications, J. Vac. Sci. Technol B, 2003, pp. 660-663, 21(2), American Vacuum Society.

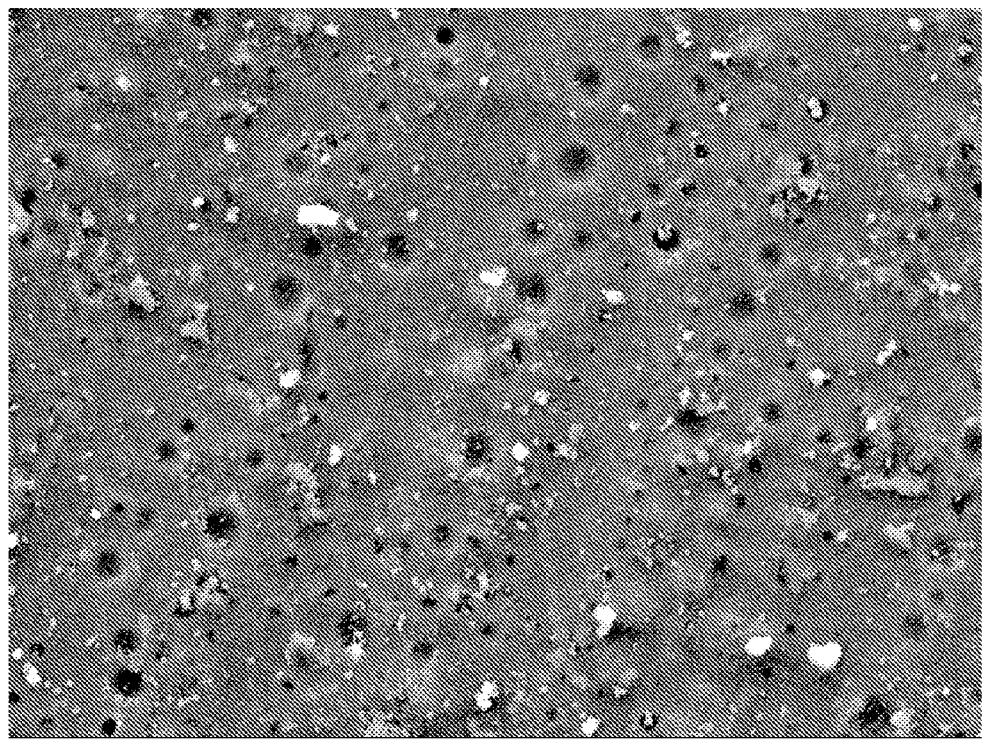
*FIG. 4A*  10μm
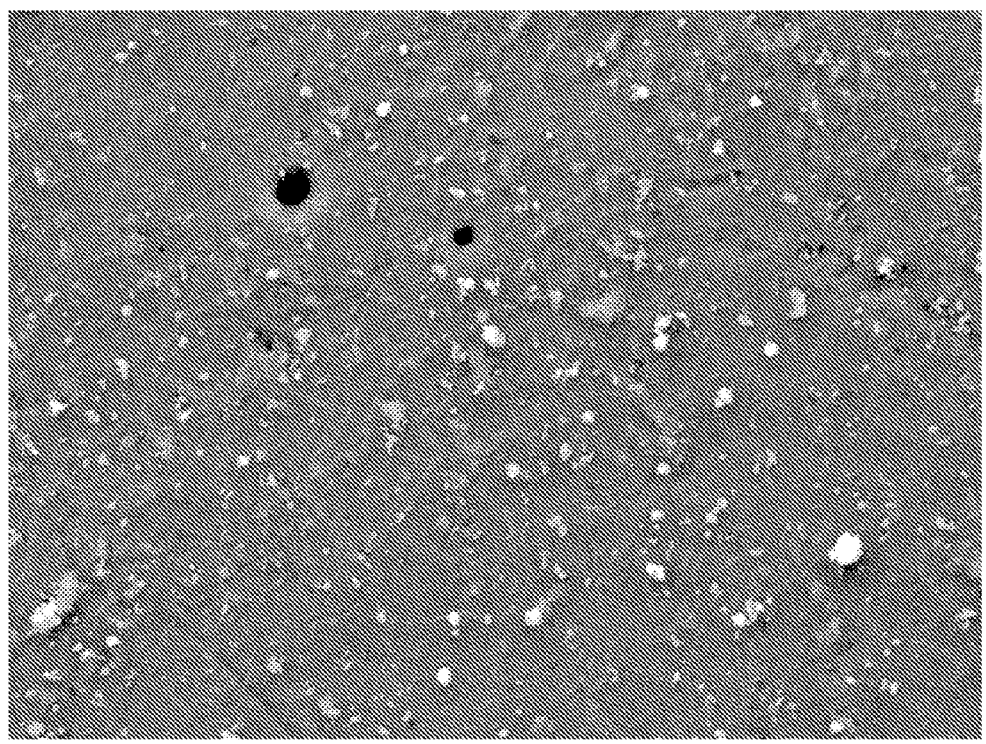
*FIG. 4B*  10μm

METHOD OF MAKING CERAMIC SHAPED ABRASIVE PARTICLES, SOL-GEL COMPOSITION, AND CERAMIC SHAPED ABRASIVE PARTICLES

FIELD

The present disclosure broadly relates to abrasive particles and methods of making them.

BACKGROUND

According to a known method of making ceramic shaped abrasive particles, a sol-gel composition comprising a ceramic precursor material is urged into mold cavities in a mold. The mold cavities typically have a predetermined shape; for example, corresponding to a regular geometric shape such as a pyramid or truncated pyramid. The sol-gel composition is then partially dried, and the resulting shaped ceramic precursor particles are removed from the mold and further processed into ceramic shaped abrasive particles.

SUMMARY

During removal of the shaped ceramic precursor particles from the mold cavities the partially dried sol-gel composition is relatively fragile and may be prone to sticking, thereby leading to breakage and/or clogging of the mold cavities in the mold. To overcome this problem, release agents have been applied to the mold prior to filling the mold cavities. However, the application of release agents to the mold may lead to shape changes of the sol-gel composition before and/or during drying such that the resulting shapes may not correspond to the shape of the mold cavities. This phenomenon causes problems with reproducibility during production such as controlling flatness and/or aspect ratio of the partially dried sol-gel material, and hence the resulting ceramic shaped abrasive particle. Additionally, the application of release agents to the mold may not be reliably coat the mold cavities in cases wherein they are very small.

Advantageously, the present inventors have discovered that the aforementioned problems can be overcome by including small amounts of dispersed oil in the sol-gel composition, while still obtaining desirable abrasive properties such as, for example, high density (low porosity).

In one aspect, the present disclosure provides a method of making shaped ceramic precursor particles, the method comprising:
providing a mold having a plurality of mold cavities, wherein each mold cavity is bounded by a plurality of faces joined along common edges;
filling at least some of the mold cavities with a sol-gel composition, the sol-gel composition comprising a liquid vehicle and a ceramic precursor, the liquid vehicle comprising a volatile component and a release agent dispersed throughout the volatile component;
removing at least a portion of the volatile component from the sol-gel composition while the sol-gel composition resides in the mold cavities thereby providing the shaped ceramic precursor particles.

In another aspect, the present disclosure provides a method of making ceramic shaped abrasive particles, the method comprising:
making shaped ceramic precursor particles according to a method of the present disclosure; and
sintering at least a portion of the shaped ceramic precursor particles to provide the ceramic shaped abrasive particles.

In another aspect, the present disclosure provides a method of making ceramic shaped abrasive particles, the method comprising:
making shaped ceramic precursor particles according to a method of the present disclosure;
calcining at least a portion of the shaped ceramic precursor particles of claim 1 to provide calcined shaped ceramic precursor particles; and
sintering at least a portion of the calcined shaped ceramic precursor particles to provide the ceramic shaped abrasive particles.

In another aspect, the present disclosure provides a sol-gel composition comprising a liquid vehicle and a ceramic precursor, the liquid vehicle comprising a volatile component and a release agent dispersed throughout the volatile component, wherein the sol-gel composition comprises a sol-gel.

In another aspect, the present disclosure provides shaped ceramic precursor particles, wherein each shaped ceramic precursor particle comprises a ceramic precursor and is bounded by a surface having a plurality of faces joined along common edges, wherein the surface has voids on at least a portion thereof, wherein the voids are shaped as hollow ellipsoidal sections, wherein the plurality of faces comprises:
an exposed face having a portion of the voids thereon, wherein the exposed face has a first density of the voids; and
a mold face that is smaller in area than the exposed face, wherein the mold face has a portion of the voids thereon, wherein the mold face has a second density of the voids, and wherein the first density of the voids is greater than the second density of the voids.

In another aspect, the present disclosure provides shaped ceramic precursor particles, wherein each shaped ceramic precursor particle comprises a ceramic precursor and is bounded by a surface having a plurality of faces joined along common edges, wherein the surface has voids on at least a portion thereof, wherein the voids are shaped as hollow ellipsoidal sections, wherein the plurality of faces comprises:
an exposed face having a portion of the voids thereon, wherein the exposed face has a first density of the voids; and
a mold face, wherein the mold face has a portion of the voids thereon, wherein the mold face has a second density of the voids, and wherein the first density of the voids is greater than the second density of the voids.

In another aspect, the present disclosure provides ceramic shaped abrasive particles, wherein each ceramic shaped abrasive particle comprises a ceramic material and is bounded by a surface having a plurality of faces joined along common edges, wherein the surface has voids on at least a portion thereof, wherein the voids are shaped as hollow ellipsoidal sections, wherein the plurality of faces comprises:
an exposed face having a portion of the voids thereon, wherein the exposed face has a first density of the voids; and
a mold face that is smaller in area than the exposed face, wherein the mold face has a portion of the voids thereon, wherein the mold face has a second density of the voids, and wherein the first density of the voids is greater than the second density of the voids.

In another aspect, the present disclosure provides ceramic shaped abrasive particles, wherein each ceramic shaped abrasive particle comprises a ceramic material and is bounded by a surface having a plurality of faces joined along common edges, wherein the surface has voids on at least a portion thereof, wherein the voids are shaped as hollow ellipsoidal sections, wherein the plurality of faces comprises:

an exposed face having a portion of the voids thereon, wherein the exposed face has a first density of the voids; and a mold face, wherein the mold face has a portion of the voids thereon, wherein the mold face has a second density of the voids, and wherein the first density of the voids is greater than the second density of the voids.

The ceramic shaped abrasive particles may be wholly composed of a ceramic material such as, for example, alpha alumina, and may have substantially a uniform morphology throughout the ceramic shaped abrasive particles.

As used herein:

The term "ellipsoid" includes ellipsoids and spheres, wherein a sphere is considered to be a special case of an ellipsoid.

The term "ellipsoidal section" refers to a section of an ellipsoid obtained by bisecting the ellipsoid with a plane.

The term "shaped ceramic precursor particle" means an uncalcined, unsintered particle produced by removing a sufficient amount of the liquid vehicle from the sol-gel composition, when it is in a mold cavity, to form a solidified body that can be removed from the mold cavity and substantially retain its molded shape in subsequent processing operations.

The term "ceramic shaped abrasive particle", means a ceramic abrasive particle with at least a portion of the abrasive particle having a predetermined shape that is replicated from a mold cavity used to form a shaped ceramic precursor particle. The shaped ceramic precursor particle will generally have a predetermined shape that substantially replicates the mold cavity that was used to form the ceramic shaped abrasive particle. Ceramic shaped abrasive particle, as used herein, excludes abrasive particles obtained by a mechanical crushing operation.

The term "theoretical oxide weight" as applied to a ceramic precursor refers the corresponding weight of ceramic produced by the ceramic precursor after sintering to form the ceramic (e.g., aluminum oxide monohydrate transforming to alpha alumina)

When referring to molded particles, the term "face" means a surface having a predetermined shape that is substantially replicated from a mold cavity. A face may correspond to a mold cavity wall (i.e., a mold face) or the opening of the mold cavity (i.e., an exposed face).

Features and advantages of the present disclosure will be further understood upon consideration of the detailed description as well as the appended claims.

BRIEF DESCRIPTION OF THE DRAWINGS

FIGS. 4A and 4B are photomicrographs of ceramic shaped abrasive particles prepared in Example 12.

While the above-identified drawing figures set forth several embodiments of the present disclosure, other embodiments are also contemplated; for example, as noted in the discussion. In all cases, the disclosure is presented by way of representation and not limitation. The figures may not be drawn to scale. Like reference numbers may have been used throughout the figures to denote like parts.

DETAILED DESCRIPTION

Figure 1:
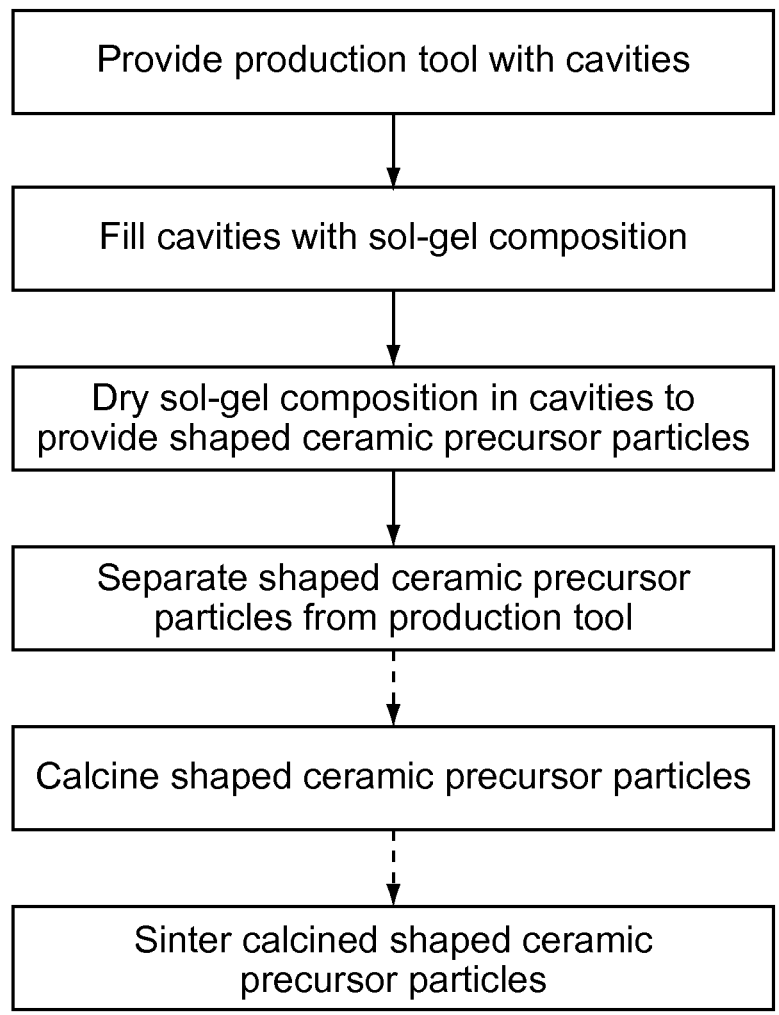
FIG. 1 is a schematic process flow diagram showing an exemplary method of making ceramic shaped abrasive particles according to the present disclosure.

An exemplary method of making ceramic shaped abrasive particles is shown in FIG. 1. In a first step, a mold is provided having a plurality of mold cavities. Each mold cavity is bounded by a plurality of sides joined along common edges and at least one outer opening. The mold can have a generally planar bottom surface and an opposite top surface. The top surface may be a structured surface that defines the mold cavities. The mold can be, for example, a belt, a sheet, a continuous web, a coating roll such as a rotogravure roll, a sleeve mounted on a coating roll, or die. The mold cavities can be configured such that sol-gel composition contained within the mold cavities will have at least one face exposed to air (or other gas) during drying.

In some embodiments, the mold has mold cavities with an outer opening bounded by one or more sides, and optionally a bottom face. The side(s) and optional bottom face may be planar or curviplanar, and are joined to one another along common edges (i.e., edges joining two faces). Sol-gel composition in such mold cavities has at least one (e.g., one or two) exposed face during initial drying of the sol-gel composition. Exemplary molds of this type are described in U.S. Patent Appln. Publ. No. 2010/0146867 A1 (Boden et al.). The bottom face may be designed into a unitary mold, or it may be formed from the second part of a two-part mold, for example, as described in U.S. Pat. No. 5,201,916 (Berg et al.).

In some embodiments, the mold cavities correspond to openings with one or more sides and no bottom surface (e.g., opening formed through a sheet as described in U.S. Pat. No. 5,201,916 (Berg et al.). The sides may be planar or curviplanar and adjacent sides are joined to one another along common edges. Sol-gel composition in such mold cavities will have two exposed faces during initial drying if not removed from the mold cavities. In some embodiments, sol-gel-compositions in such a mold may be separated from the mold and disposed on substrate prior to initial drying. In such embodiments, on that portion of the sol-gel composition that is in contact with the substrate is not an exposed to air (or other gas) during drying.

The mold can comprise any suitable material such as, for example, metal, or a polymeric material. Examples of suitable polymeric materials include thermoplastics such as polyesters, polycarbonates, poly(ether sulfone), poly(methyl methacrylate), polyurethanes, polyvinylchloride, polyolefins, polystyrene, polypropylene, polyethylene or combinations thereof, and crosslinked thermosetting materials. In some embodiments, the entire mold is made from a polymeric material. In another embodiment, the top surface of the mold, which includes the mold cavities, and which is in contact with the sol-gel composition while drying, comprises polymeric materials and other portions of the molding can be made from other materials. For example, a suitable polymeric coating may be applied to a metal mold to change its surface tension properties.

A polymeric mold can be replicated off a metal master tool. The master tool will have the inverse pattern desired for the mold. The master tool can be made in the same manner as the mold. In some embodiments, the master tool is made out of metal (e.g., nickel) and is diamond turned. A polymeric sheet material can be heated along with the master tool such that the polymeric material is embossed with the master tool pattern by pressing the two together. A polymeric material can also be extruded or cast onto the master tool and then pressed. The polymeric material is cooled to solidify and produce the mold. If a thermoplastic mold is utilized, then care should be taken not to generate excessive heat that may distort the thermoplastic mold limiting its life. More information concerning the design and fabrication of molds and/or master tools can be found, for example, in U.S. Pat. No. 5,152,917 (Pieper et al.); U.S. Pat. No. 5,435,816 (Spurgeon et al.); U.S. Pat. No. 5,672,097 (Hoopman et al.); U.S. Pat. No. 5,946,991 (Hoopman et al.); U.S. Pat. No. 5,975,987 (Hoopman et al.); and U.S. Pat. No. 6,129,540 (Hoopman et al.).

Access to mold cavities can be from an opening in the top surface and/or bottom surface of the mold. In some embodiments, mold cavities can extend for the entire thickness of mold. In some embodiments, mold cavities can extend only for a portion of the thickness of the mold. In some embodiments, the top surface is substantially parallel to bottom surface of the mold with the mold cavities having a substantially uniform depth. At least one side of the mold (e.g., the side in which the mold cavity is formed) can remain exposed to the surrounding atmosphere during the step in which the volatile component is removed.

The mold cavities have a specified three-dimensional shape. In some embodiments, the shape of a mold cavity can be described as being a triangle, as viewed from the top, having a sloping sidewall such that the bottom surface of the mold cavity is slightly smaller than the opening in the top surface. A sloping sidewall may enhance grinding performance and enable easier removal of the shaped ceramic precursor particles from the mold. In another embodiment, the mold comprised a plurality of triangular mold cavities. Each of the plurality of triangular mold cavities comprises an equilateral triangle.

Other mold cavity shapes can also be used such as, for example, circles, rectangles, squares, hexagons, stars, or combinations thereof, all having a substantially uniform depth dimension. The depth dimension is equal to the perpendicular distance from the outer edge of the mold cavity to the deepest of the mold cavity. The depth of a given mold cavity can be uniform or can vary along its length and/or width. The mold cavities of a given mold can be of the same shape or of different shapes.

Next, the mold cavities are filled with the sol-gel composition. Any technique may be used such as, for example, knife roll coater or vacuum slot die coater. In some embodiments, a top surface of the mold is coated with the sol-gel composition. Next, a scraper or leveler bar can be used to force the sol-gel composition fully into the mold cavity of the mold. The remaining portion of the sol-gel composition that does not enter a mold cavity can be removed from top surface of the mold and recycled. In some embodiments, a small portion of the sol-gel composition can remain on top surface and in other embodiments the top surface is substantially free of the dispersion. The pressure applied by the scraper or leveler bar is typically less than 100 psi (690 kPa), or less than 50 psi (340 kPa), or less than 10 psi (69 kPa). In some embodiments, no exposed surface of the sol-gel composition extends substantially beyond the top surface to ensure uniformity in thickness of the resulting ceramic shaped abrasive particles.

The sol-gel composition comprises a liquid vehicle having a ceramic precursor dissolved or dispersed therein. The sol-gel composition may be a seeded or non-seeded sol-gel composition comprising a dissolved or dispersed ceramic precursor (e.g., as nanometer-scale particles (i.e., nanoparticles)) that can be converted into a ceramic material such as, for example, alpha alumina, silica, ceria, titania, zirconia, spinel, or a mixture thereof.

In some embodiments, the ceramic precursors are selected from hydroxides, oxyhydroxides of aluminum, silicon, titanium, cerium, and zirconium, and water-soluble and/or reactive salts and compounds thereof; for example, aluminum chloride hexahydrate, aluminum nitrate nonahydrate, aluminum hydroxide (gibbsite), aluminum oxide monohydrate (including boehmite), aluminum isopropoxide, aluminum isobutoxide, and tetraethyl orthosilicate. In some embodiments, the metal oxide includes transition metal oxides, rare earth metal oxides, mineral oxides, ceramic oxides, or any combination thereof. Exemplary oxides include alumina, silica, titania, zirconia, yttria-stabilized zirconia, niobium oxide, and tantalum oxide.

Many sols suitable for making ceramics are commercially available. For example, boehmite sols suitable for producing alpha alumina are available from Sasol North America Inc., Houston, Tex. Silica sols suitable for producing silica are available from Nalco Company, Naperville, Ill. Ceria sols are available from Eminess Technologies, Inc., Scottsdale, Ariz. Zirconia, silica, and alumina sols are available from Nissan Chemical America Corporation, Houston Tex.

In addition to the ceramic precursor, the sol-gel composition includes a liquid vehicle that is a volatile component. Sol-gel compositions useful in practice of the present disclosure may be free of dispersed latex particles. In some embodiments, the volatile component comprises water. In some embodiments, the liquid vehicle comprises water in combination with a water-soluble or water-miscible organic solvent such as, for example methanol, ethanol, propanol, or 2-methoxyethanol.

The sol-gel composition should comprise a sufficient amount of the liquid vehicle for the viscosity of the sol-gel composition to be sufficiently low to enable filling the mold cavities and replicating the mold surface, but not so much liquid vehicle as to cause subsequent removal of the liquid vehicle from the mold cavities to be prohibitively expensive. In some embodiments, the sol-gel composition comprises from 2 percent to 90 percent by weight of a ceramic precursor that can be converted into alpha alumina such as, for example, particles of aluminum oxide monohydrate, and at least 10 percent by weight, or from 50 percent to 70 percent, or 50 percent to 60 percent, by weight of water. Conversely, the sol-gel composition in some embodiments contains from 30 percent to 50 percent, or 40 percent to 50 percent, by weight of the ceramic precursor.

The ceramic precursor may comprise boehmite. Boehmite in suitable form can be prepared by known techniques or can be obtained commercially. Examples of commercially available boehmite include products having the trademarks "DISPERAL", and "DISPAL", both available from Sasol North America, Inc. or "HIQ-40" available from BASF Corporation. These aluminum oxide monohydrates are relatively pure; i.e., they include relatively little, if any, hydrate phases other than monohydrates, and have a high surface area. The physical properties of the resulting ceramic shaped abrasive particles will generally depend upon the type of ceramic precursor used in the sol-gel composition.

In some embodiments, the sol-gel composition is in a gel state. As used herein, a "sol-gel" is a three-dimensional network of solids, formed by gelation of a ceramic precursor that is dissolved or dispersed in a liquid vehicle. The sol-gel composition may contain a modifying additive or precursor of a modifying additive. The modifying additive can function to enhance some desirable property of the ceramic shaped abrasive particles or increase the effectiveness of the subsequent sintering step. Modifying additives or precursors of modifying additives can be in the form of soluble salts, typically water-soluble salts. They typically consist of a metal-containing compound, and can be a precursor of oxides of magnesium, zinc, iron, silicon, cobalt, nickel, zirconium, hafnium, chromium, yttrium, praseodymium, samarium, ytterbium, neodymium, lanthanum, gadolinium, cerium, dysprosium, erbium, titanium, or mixtures thereof. The particular concentrations of these additives that can be present in the sol-gel composition can be varied based on skill in the art. Typically, the introduction of a modifying additive or precursor of a modifying additive to the ceramic precursor will cause formation of the sol-gel composition. Ceramic precursor solutions/dispersions can also be induced to gel by application of heat over a period of time.

The sol-gel composition can also contain a nucleating agent to enhance the transformation of hydrated or calcined aluminum oxide to alpha alumina Nucleating agents suitable for this purpose include fine particles of alpha alumina, alpha ferric oxide or its precursor, titanium oxides and titanates, chrome oxides, or any other material that will nucleate the transformation. The amount of nucleating agent, if used, should be sufficient to effect the transformation to alpha alumina Nucleating such sol-gel compositions is disclosed in U.S. Pat. No. 4,744,802 (Schwabel).

A peptizing agent can be included in the sol-gel composition to produce a more stable hydrosol or colloidal sol-gel composition. Suitable peptizing agents include, for example, monoprotic acids or acid compounds such as acetic acid, hydrochloric acid, formic acid, and nitric acid. Multiprotic acids can also be used, but they can rapidly gel the sol-gel composition, making it difficult to handle or to introduce additional components thereto. Some commercial sources of boehmite contain an acid titer (such as absorbed formic or nitric acid) that will assist in forming a stable sol-gel composition.

The sol-gel composition can be formed by any suitable means, many of which are well known to those of ordinary skill in the art. For example, in the case of a boehmite sol-gel, it may be prepared by simply by mixing aluminum oxide monohydrate (i.e., boehmite) with water containing a peptizing agent or by forming an aluminum oxide monohydrate slurry to which the peptizing agent is added. Defoamers or other suitable chemicals can be added to reduce the tendency to form bubbles or entrain air while mixing. Additional chemicals such as metal oxide ceramic precursors, wetting agents, alcohols, or coupling agents can be added if desired. The resultant alpha alumina abrasive particle grain may contain silica and iron oxide as disclosed in U.S. Pat. No. 5,645,619 (Erickson et al.). Alpha alumina abrasive particles may contain zirconia as disclosed in U.S. Pat. No. 5,551,963 (Larmie). Alternatively, alpha alumina abrasive particles can have a microstructure or additives as disclosed in U.S. Pat. No. 6,277,161 (Castro).

The liquid vehicle comprises a volatile component (e.g., water and/or organic solvent) and a release agent dispersed in the volatile component. The release agent may be dispersed in the form of droplets or fine particles, although it may be emulsified (e.g., using one or more emulsifiers). The sol-gel composition may contain the release agent in an amount of from 0.08 to 4.25 percent of the theoretical oxide weight of the ceramic precursor, although other amounts may also be used. In some embodiments, the sol-gel composition contains the release agent in an amount of from 0.2 to 2.0 percent of the theoretical oxide weight of the ceramic precursor. In some embodiments, the sol-gel composition contains the release agent in an amount of from 0.42 to 0.75 percent of the theoretical oxide weight of the ceramic precursor.

Examples of release agents include fluorochemicals (e.g., perfluorinated ethers and polyethers, fluorinated alkanes, and combinations thereof), hydrocarbons, and silicones. The release agent may comprise an oil or combination of oils. The release agent may be added to the remaining ingredients in the sol-gel composition using a high-shear mixer or homogenizer. Suitable high shear mixers are widely available from commercial sources. Once fully gelled, viscosity of the sol-gel mixture inhibits phase bulk separation of the release agent (e.g., to form a layer on the surface of the sol-gel composition).

After filling at least some of the mold cavities with the sol-gel composition, the mold is placed into an oven and heated at sufficient temperature and for sufficient time to remove a majority of the liquid vehicle, or even sufficient liquid vehicle that the dried sol-gel composition has sufficient resistance to flow and cohesive strength that it can be separated from the mold and handled. Desirably, the liquid vehicle is removed at a fast evaporation rate. In some embodiments, removal of the liquid vehicle by evaporation occurs at temperatures above the boiling point of volatile components comprising the liquid vehicle. An upper limit to the drying temperature often depends on the material the mold is made from. For polypropylene molding the temperature should be less than the melting point of the plastic.

In embodiments including an aqueous sol-gel composition of between about 40 to 50 percent solids and a polypropylene mold, the drying temperatures can be between about 90° C. and about 165° C., or between about 105° C. and about 150° C., or between about 105° C. and about 120° C.

In some embodiments, after at least partially drying the sol-gel composition to provide shaped ceramic precursor particles, the shaped ceramic precursor particles are typically removed from the mold cavities, although if desired the mold may be consumed by combustion (e.g., during calcining) In other embodiments, the sol-gel composition can be removed from the mold cavities prior to drying. The sol-gel composition and/or shaped ceramic precursor particles can be removed from the mold cavities by using the following processes alone or in combination on the mold: gravity, vibration, ultrasonic vibration, vacuum, or pressurized air to remove the particles from the mold cavities.

Figure 2A:
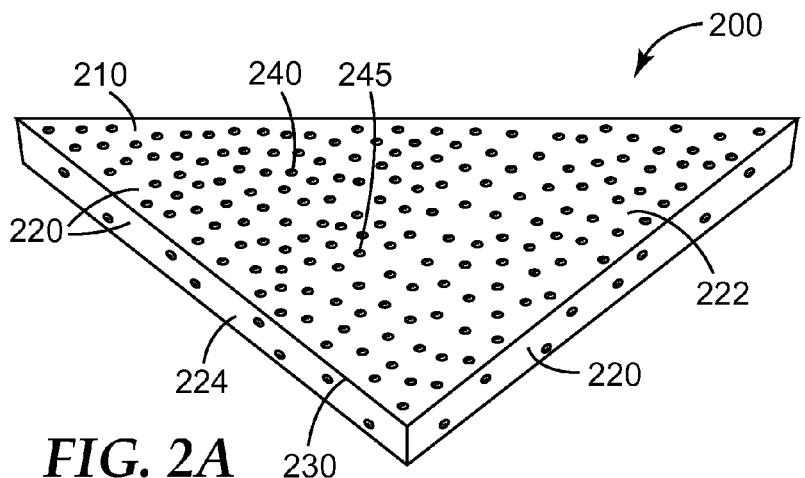
FIGS. 2A and 2B are, respectively, top and bottom schematic perspective views of exemplary shaped ceramic precursor particles according to the present disclosure.
Figure 2B:
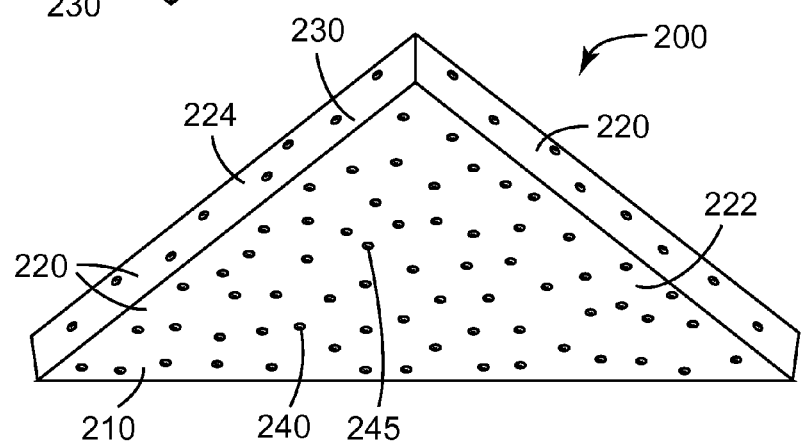

FIGS. 2A and 2B show an exemplary shaped ceramic precursor particle according to the present disclosure. Referring now to FIGS. 2A and 2B, shaped ceramic precursor particle 200 is bounded by a surface 210 having a plurality of faces 220 joined along common edges 230. Surface 210 comprises voids 240 on a portion, or all of, surface 210. Voids 240 comprise hollow ellipsoidal sections (e.g., as if they were scooped out with a hemispherical ice-cream scoop). Exposed face 222 has a first density of the voids 240 (i.e., the area of the void openings 445 in the exposed face 222 divided by the total area of exposed face 222). Mold face 224 has a second density of the voids 240 (i.e., the area of the void openings 245 in mold face 224 divided by the total area of mold face 224).

The shaped ceramic precursor particles can be further dried outside of the mold. If the sol-gel composition is dried to the desired level in the mold this additional drying step is not necessary. However, in some instances it may be economical to employ this additional drying step to minimize the time that the sol-gel composition resides in the mold cavities of the mold. Typically, the shaped abrasive precursor particles will be dried from 10 seconds to 120 minutes, or from 1 to 10 minutes, at a temperature of from 50° C. to 160° C., or more typically at a temperature of from 120° C. to 150° C., although other conditions may also be used.

Without wishing to be bound by theory, it is believed that the voids result from oil that migrates to the surfaces as droplets, and that preferential migration to the exposed surface is driven by the sol-gel composition/air interface.

In embodiments wherein the ceramic shaped abrasive particles are formed by a method according to the present disclosure, the exposed face 222, or exposed face 322, correspond to an exposed face of the sol-gel composition while disposed in a mold cavity (i.e., a face not formed against a mold cavity wall), and mold face 224, or mold face 324, corresponds to a mold surface within the mold cavity (i.e., a face formed against a mold cavity wall). In some embodiments, the first and second faces may contact each other. In other embodiments, the first and second faces do not contact each other (e.g., they may be spaced apart by adjoining faces, for example, as in the case of a top face and a bottom face). Any or all of the faces may be planar, concave, convex, or a combination thereof. The ceramic shaped abrasive particles may have a shape selected from the group consisting of pyramids, truncated pyramids, prisms, and combinations thereof.

At this stage, the shaped ceramic precursor particles generally contain oil droplets within the interior of the particle. Upon further heating the oil droplets are vaporized leaving behind ellipsoidal cavities within the interior of the resultant ceramic shaped abrasive particles.

Optionally, the shaped ceramic precursor particles can be calcined to provide calcined shaped ceramic precursor particles. During calcining, essentially all volatile material is removed, and the various components that were present in the ceramic precursor are transformed into metal oxides. The shaped abrasive precursor particles are generally heated to a temperature of from 400° C. to 800° C., and maintained within this temperature range until the free water and more than 90 percent by weight of any bound volatile material are removed. In an optional step, it may be desired to introduce a modifying additive by an impregnation process. A water-soluble salt can be introduced by impregnation into pores of the calcined, shaped abrasive precursor particles. Then, the shaped abrasive precursor particles are calcined again. This option is further described in U.S. Pat. No. 5,164,348 (Wood).

The shaped ceramic precursor particles and/or calcined shaped ceramic precursor particles can be sintered to provide the ceramic shaped abrasive particles. Prior to sintering, the calcined, shaped abrasive precursor particles are not completely densified, and thus lack the desired hardness to be used as shaped abrasive particles. Sintering takes place by heating the calcined, shaped abrasive precursor particles to a temperature of from about 1,000° C. to about 1,650° C., and maintaining them within this temperature range until substantially all of the ceramic precursor material is converted into ceramic material. For example, alpha alumina monohydrate (or equivalent) may be converted to alpha alumina and the porosity is reduced to less than 15 percent by volume. The length of time to which the calcined, shaped abrasive precursor particles must be exposed to the sintering temperature to achieve this level of conversion depends upon various factors but usually from 5 seconds to 48 hours is typical.

In another embodiment, the duration for the sintering step ranges from one minute to 90 minutes. After sintering, the resulting ceramic shaped abrasive particles can have a Vickers hardness of 10 gigapascals (GPa), 16 GPa, 18 GPa, 20 GPa, or greater.

Sintering, optionally after calcining, the shaped ceramic precursor particles results in corresponding ceramic shaped abrasive particles. After sintering, any release agent that may have been present in the shaped ceramic precursor particles has been burned off.

Figure 3A:
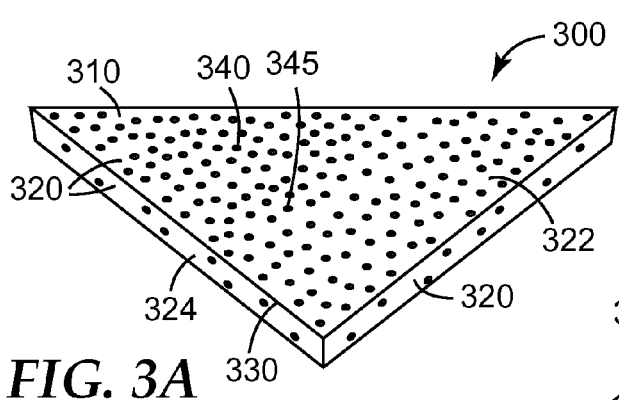
FIGS. 3A and 3B are, respectively, top and bottom schematic perspective views of exemplary ceramic shaped abrasive particles according to the present disclosure.
Figure 3B:
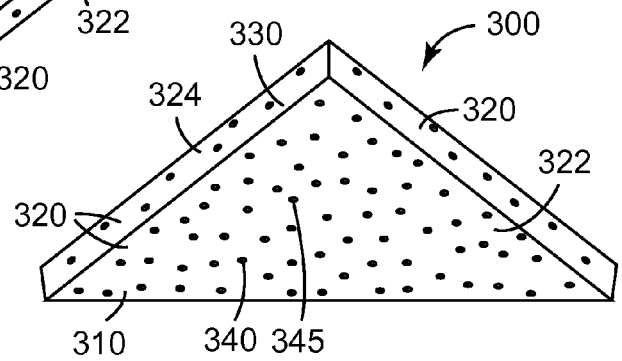

FIGS. 3A and 3B show an exemplary ceramic shaped abrasive particle according to the present disclosure. Referring now to FIGS. 3A and 3B, ceramic shaped abrasive particle 300 is bounded by a surface 310 having a plurality of faces 320 joined along common edges 330. Surface 310 comprises voids 340 on a portion, or all of, surface 310. Voids 340 comprise hollow ellipsoidal sections (e.g., as if they were scooped out with a hemispherical ice-cream scoop). Exposed face 322 has a first density of the voids 340 (i.e., the area of the void openings 345 in the exposed face 322 divided by the total area of exposed face 322). Mold face 324 has a second density of the voids 340 (i.e., the area of the void openings 345 in mold face 324 divided by the total area of mold face 324).

Other steps can be used to modify the described process such as, for example, rapidly heating the material from the calcining temperature to the sintering temperature, centrifuging the sol-gel composition to remove sludge or other waste. Moreover, the process can be modified by combining two or more of the process steps if desired. Conventional process steps that can be used to modify the process of this disclosure are more fully described in U.S. Pat. No. 4,314,827 (Leitheiser). Additionally, the ceramic shaped abrasive particles can have grooves on one of the faces as described in U.S. Patent Appln. Publ. No. 2010/0146867 A1 (Boden et al.). The grooves are formed by a plurality of ridges in the bottom surface of the mold cavities, and may make it easier to remove the shaped abrasive precursor particles from the mold. More information concerning methods to make ceramic shaped abrasive particles is disclosed in U. S. Patent Appl. Publ. No. 2009/0165394 A1 (Culler et al.).

In some embodiments, the ceramic shaped abrasive particles comprise alpha alumina. In those embodiments, and others, the ceramic shaped abrasive particles may have a true density of at least 3.8, at least 3.85, or even at least 3.9 grams per cubic centimeter.

In embodiments wherein the ceramic shaped abrasive particles are formed by a method according to the present disclosure, the exposed face 222, or exposed face 322, correspond to an exposed face of the sol-gel composition while disposed in a mold cavity (i.e., a face not formed against a mold cavity wall), and mold face 224, or mold face 324, corresponds to a mold surface within the mold cavity (i.e., a face formed against a mold cavity wall). In some embodiments, the first and second faces may contact each other. In other embodiments, the first and second faces do not contact each other (e.g., they may be spaced apart by adjoining faces, for example, as in the case of a top face and a bottom face). Any or all of the faces may be planar, concave, convex, or a combination thereof. The ceramic shaped abrasive particles may have a shape selected from the group consisting of pyramids, truncated pyramids, prisms, and combinations thereof.

In some embodiments, the voids of the ceramic shaped abrasive precursor particles and/or the ceramic shaped abrasive particles have an average Feret diameter in a range of from about 1.2 microns to about 2.0 microns, or from about 1.5 microns to about 1.7 microns.

Ceramic shaped abrasive particles according to the present disclosure can be incorporated into an abrasive article, or used in loose form. Abrasive particles are generally graded to a given particle size distribution before use. Such distributions typically have a range of particle sizes, from coarse particles to fine particles. In the abrasive art this range is sometimes referred to as a "coarse", "control", and "fine" fractions. Abrasive particles graded according to abrasive industry accepted grading standards specify the particle size distribution for each nominal grade within numerical limits. Such industry accepted grading standards (i.e., abrasive industry specified nominal grade) include those known as the American National Standards Institute, Inc. (ANSI) standards, Federation of European Producers of Abrasive Products (FEPA) standards, and Japanese Industrial Standard (JIS) standards.

ANSI grade designations (i.e., specified nominal grades) include: ANSI 4, ANSI 6, ANSI 8, ANSI 16, ANSI 24, ANSI 36, ANSI 40, ANSI 50, ANSI 60, ANSI 80, ANSI 100, ANSI 120, ANSI 150, ANSI 180, ANSI 220, ANSI 240, ANSI 280, ANSI 320, ANSI 360, ANSI 400, and ANSI 600. FEPA grade designations include P8, P12, P16, P24, P36, P40, P50, P60, P80, P100, P120, P150, P180, P220, P320, P400, P500, P600, P800, P1000, and P1200. JIS grade designations include JIS8, JIS12, JIS16, JIS24, JIS36, JIS46, JIS54, JIS60, JIS80, JIS100, JIS150, JIS180, JIS220, JIS240, JIS280, JIS320, JIS360, JIS400, JIS600, JIS800, JIS1000, JIS1500, JIS2500, JIS4000, JIS6000, JIS8000, and JIS10,000.

Alternatively, the ceramic shaped abrasive particles can be graded to a nominal screened grade using U.S.A. Standard Test Sieves conforming to ASTM E-11 "Standard Specification for Wire Cloth and Sieves for Testing Purposes." ASTM E-11 proscribes the requirements for the design and construction of testing sieves using a medium of woven wire cloth mounted in a frame for the classification of materials according to a designated particle size. A typical designation may be represented as −18+20 meaning that the ceramic shaped abrasive particles pass through a sieve meeting ASTM E-11 specifications for the number 18 sieve and are retained on a sieve meeting ASTM E-11 specifications for the number 20 sieve. In some embodiments, the ceramic shaped abrasive particles have a particle size such that most of the particles pass through an 18 mesh test sieve and can be retained on a 20, 25, 30, 35, 40, 45, or 50 mesh test sieve. In various embodiments, the ceramic shaped abrasive particles can have a nominal screened grade comprising: −18+20, −20+25, −25+30, −30+35, −35+40, −40+45, −45+50, −50+60, −60+70, −70+80, −80+100, −100+120, −120+140, −140+170, −170+200, −200+230, −230+270, −270+325, −325+400, −400+450, −450+500, or −500+635. In some embodiments, the ceramic shaped abrasive particles have a particle size less than 25 millimeters, less than 15 millimeters, or less than 5 millimeters.

If desired, ceramic shaped abrasive particles having an abrasives industry specified nominal grade or a nominal screened grade can be mixed with other known abrasive or non-abrasive particles. In some embodiments, at least 5, 10, 15, 20, 25, 30, 35, 40, 45, 50, 55, 60, 65, 70, 75, 80, 85, 90, 95, or even 100 percent by weight of the plurality of abrasive particles having an abrasives industry specified nominal grade or a nominal screened grade are ceramic shaped abrasive particles according to the present disclosure, based on the total weight of the plurality of abrasive particles.

Particles suitable for mixing with the ceramic shaped abrasive particles include conventional abrasive grains, diluent grains, or erodible agglomerates, such as those described in U.S. Pat. No. 4,799,939 (Markhoff-Matheny et al.) and U.S. Pat. No. 5,078,753 (Broberg et al.). Representative examples of conventional abrasive grains include fused aluminum oxide, silicon carbide, garnet, fused alumina zirconia, cubic boron nitride, diamond, and the like. Representative examples of diluent grains include marble, gypsum, and glass. Blends of differently shaped ceramic shaped abrasive particles can be used in the articles of this invention.

The ceramic shaped abrasive particles may also have a surface coating. Surface coatings are known to improve the adhesion between abrasive grains and the binder in abrasive articles or can be used to aid in electrostatic deposition of the ceramic shaped abrasive particles. Such surface coatings are described in U.S. Pat. No. 5,213,591 (Celikkaya et al.); U.S. Pat. No. 5,011,508 (Wald et al.); U.S. Pat. No. 1,910,444 (Nicholson); U.S. Pat. No. 3,041,156 (Rowse et al.); U.S. Pat. No. 5,009,675 (Kunz et al.); U.S. Pat. No. 5,085,671 (Martin et al.); U.S. Pat. No. 4,997,461 (Markhoff-Matheny et al.); and U.S. Pat. No. 5,042,991 (Kunz). Additionally, the surface coating may prevent the shaped abrasive particle from capping. Capping is the term to describe the phenomenon where metal particles from the workpiece being abraded become welded to the tops of the shaped abrasive particles. Surface coatings to perform the above functions are known to those of skill in the art.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight.

Example 1

An alumina sol was prepared by combining 2316 grams deionized water and 66 grams of nitric acid in a high-shear mixer (Scott Turbon Mixer, Adelanto, Calif.) operating at 1601 RPM. 1600 grams of aluminum oxide monohydrate (available as DISPERAL from Sasol North America, Houston, Tex.) was added over one minute After 5 minutes, an additional 6 grams of nitric acid were added, after seven minutes of mixing 12 grams of peanut oil (available as PEANUT OIL, N.F. from Alnor Oil Company, Valley Stream, N.Y.) (0.88 percent of theoretical oxide weight of boehmite) was added to the mix and incorporated for 2 minutes. The batch size was 4000 grams. The resultant composition was allowed to gel and age for 24 hours before use thereby providing a sol-gel composition.

The sol-gel composition was forced into cavities of a microreplicated mold using a 5-inch (13-cm) wide stainless steel putty knife. The mold was a 9 in×13 in (23 cm×33 cm) piece of polypropylene having triangular-shaped mold cavities (110 mils (2.8 mm) each side×28 mils (0.7 mm) deep). The draft angle between the sidewall mold face and bottom mold face was 98 degrees. The mold was manufactured to have 50 percent of the mold cavities with 8 parallel ridges rising from the bottom surfaces of the mold cavities that intersected with one side of the triangle at a 90 degree angle, and the remaining mold cavities had a smooth bottom mold cavity surface. The parallel ridges were spaced every 0.277 mm, and the cross-section of the ridges was a triangle shape having a height of 0.0127 mm and a 45 degree angle between the sides of each ridge at the tip. The excess sol-gel composition was carefully removed from the molding with the putty knife. The coated molding was then placed in an air convection oven at 45° C. for 1.5 hours to remove water and dry the sol-gel composition to shaped particles. The particles were removed from the molding with the aid of an ultrasonic horn. The shaped abrasive precursor particles with 0.75 percent peanut oil were calcined at approximately 650° C. (15 minutes) and then saturated with a mixed nitrate solution of the following concentration (reported as oxides): 1.0% MgO, 1.2% $Y_2O_3$, 4.0% $La_2O_3$ and 0.05% CoO. The excess nitrate solution was removed and the saturated shaped abrasive precursor particles were allowed to dry after which the particles were again calcined at 650° C. (15 minutes) and sintered at approximately 1400° C. (5 minutes). Both the calcining and sintering was performed using rotary tube kilns. The resulting shaped particles were evaluated for bulk density and true density. Bulk Density was measured according to ANSI B74.4-1992 "Procedure for Bulk Density of Abrasive Grains." The True Density was measured using a Micromeritics ACCUPYC 1330 HELIUM PYCNOMETER (Micromeritics Instrument Corporation, Norcross, Ga.).

Comparative Example A

Comparative Example A was made identically to that of Example 7, with the exception that no peanut oil was added. Substantially all of the particles fractured while drying in the mold cavities, but released successfully from the mold.

Examples 2-11

Examples 2-12 were prepared as in Example 1, with the exception that varying amounts of peanut oil were incorporated as shown in Table 1.

Comparative Example B

A boehmite sol-gel was made using the following recipe: aluminum oxide monohydrate powder (1600 parts) having the trade designation "DISPERAL" was dispersed by high shear mixing a solution containing water (2400 parts) and 70 percent aqueous nitric acid (72 parts) for 11 minutes. The resulting sol-gel was aged for at least one hour before coating. The sol-gel was forced into a mold having triangular shaped mold cavities of 28 mils (0.71 mm) depth and 110 mils (2.79 mm) on each side. The draft angle between the sidewall and bottom of the mold cavity was 98 degrees. The mold was manufactured to have 50 percent of the mold cavities with 8 parallel ridges rising from the bottom surfaces of the mold cavities that intersected with one side of the triangle at a 90 degree angle and the remaining mold cavities had a smooth bottom surface. The parallel ridges were spaced every 0.277 mm and the cross section of the ridges was a triangle shape having a height of 0.0127 mm and a 45 degree angle between the sides of each ridge at the tip as described in U.S. Patent Appln. Publ. No. 2010/0146867 A1 (Boden et al.).

The sol-gel was forced into the mold cavities with a putty knife so that the openings of the molding were completely filled. A mold release agent, 0.2 percent peanut oil in methanol was used to coat the molding with about 0.5 $mg/in^2$ (0.08 $mg/cm^2$) of peanut oil applied to the molding. The excess methanol was removed by placing sheets of the molding in an air convection oven for 5 minutes at 45° C. The sol-gel coated molding was placed in an air convection oven at 45° C. for at least 45 minutes to dry. The precursor shaped abrasive particles were removed from the molding by passing it over an ultrasonic horn. The precursor shaped abrasive particles were calcined at approximately 650° C., and then saturated with a mixed nitrate solution of the following concentration (reported as oxides): 1.8 percent each of MgO, $Y_2O_3$, $Nd_2O_3$, and $La_2O_3$. The excess nitrate solution was removed and the saturated precursor shaped abrasive particles with openings were allowed to dry after which the particles were again calcined at 650° C. and sintered at approximately 1400° C. Both the calcining and sintering was performed using rotary tube kilns.

Composition and/or density of Examples 1-11 and Comparative Examples A and B are reported in Table 1 (below).

TABLE 1

| EXAMPLE | PEANUT OIL, as a percent of weight of aluminum oxide monohydrate | PEANUT OIL, calculated as a percent of the theoretical oxide weight of aluminum oxide monohydrate | BULK DENSITY, grams per cubic centimeter | TRUE DENSITY, grams per cubic centimeter |
|---|---|---|---|---|
| Comparative Example A | 0 | 0 | 1.5 | 3.965 |
| Comparative Example B | 0 | 0, oil applied to mold | 1.82 | 3.9635 |
| 2 | 0.1 | 0.1 | 1.71 | 3.9662 |
| 3 | 0.2 | 0.2 | 1.69 | 3.9551 |
| 4 | 0.3 | 0.4 | 1.66 | 3.9544 |
| 5 | 0.4 | 0.5 | 1.73 | 3.9505 |
| 6 | 0.5 | 0.6 | 1.77 | 3.9445 |
| 7 | 0.65 | 0.76 | 1.77 | 3.9354 |
| 1 | 0.75 | 0.88 | 1.83 | 3.9292 |
| 8 | 0.85 | 1.0 | 1.74 | 3.9074 |
| 9 | 1.0 | 1.2 | 1.77 | 3.8883 |
| 10 | 1.5 | 1.8 | 1.81 | 3.8745 |
| 11 | 2.0 | 2.4 | 1.81 | 3.8161 |

For Examples 1 to 11, the shaped abrasive particle precursors readily released from their respective mold cavities without the need for release agents separately applied to the molding. As is apparent from Table 1, the introduction of increasing amounts of peanut oil into the sol-gel composition resulted in an increase in bulk density (due, at least in part, to an increase in particle shrinkage at firing) and a decrease in true density (due to the introduction of porosity).

X-Ray diffraction confirmed that the ceramic shaped abrasive particles prepared in Examples 2-11 were primarily corundum with a detectable amount of magnesium lanthanum aluminate. This is the typical and expected fired chemistry for this material.

Example 12

Example 12 was prepared as in Example 1, with the exception that peanut oil was included in an amount of 2.75 percent of the weight of aluminum oxide monohydrate (3.24 percent of theoretical oxide weight). FIGS. 4A and 4B respectively show the top (exposed) surface and the bottom (mold) surface of a resultant ceramic shaped abrasive particle. These photomicrographs show the non-uniform distribution of voids on the two faces, with FIG. 4A showing at least 10 times the number of voids compared with FIG. 4B.

Example 13

The exposed face (corresponding to a mold cavity outer opening) and a bottom mold face (opposite the exposed outer face) of ten ceramic shaped abrasive particles (i.e., fired) prepared according to Example 7 (i.e., peanut oil was present in an amount of 0.65 percent of the weight of aluminum oxide monohydrate) were independently imaged using a JEOL 7600F field emission scanning electron microscope (from JEOL Ltd., Tokyo, Japan) at 2,000× using backscattered electrons. Because of the relatively high magnification, a random area was selected on each of the particles. The images were subsequently analyzed using ImageJ image analysis software. Data was obtained by manually measuring the area of individual exposed voids and combining these individual pore area measurements to obtain the total area of voids per image, and then dividing this value by the total field of view area to ultimately obtain the "area percentage covered with porosity" for each of the ten exposed faces and ten mold faces. The percent of the surface area of each face that was occupied by the voids was as follows: exposed face-mean=0.72 percent, standard deviation=0.50 percent; and mold face-mean=0.16 percent, standard deviation=0.14 percent.

Example 14

The procedure was the same as that of Example 7, except that coconut oil was substituted for peanut oil, and the coconut oil was heated in an oven at 45° C. until it was liquid prior to combining with the remaining components.

Example 15

A metal screen was used in this example. The metal screen was 22 mils (0.56 mm) thick, and had equilateral triangular openings, 0.110 inch (2.8 mm) on each side. Sol-gel composition prepared as in Example 1 was applied to the metal screen using a putty knife, thereby filling the openings in the screen. The screen was removed immediately and the sample was dried at 45° C. for 15 minutes.

Example 16

Example 15 was repeated, except: the metal screen was held vertical while sol-gel was applied using a plastic squeegee; excess sol-gel was skived away on both sides of screen simultaneously; the sol-gel coated metal screen was dried at 45° C. for 15 minutes; and particles fell from screen into a collection pan during drying.

Example 17

The exposed face (corresponding to a mold cavity outer opening) and the bottom mold face (opposite the exposed outer face) of ten ceramic shaped abrasive precursor (i.e., unfired) particles were independently imaged using a JEOL 7600F field emission scanning electron microscope at 2,000× using backscattered electrons. The particles were prepared according to Example 1, except that the particles were unfired and the level of peanut oil was 2.5 percent of the weight of aluminum oxide monohydrate (2.9 percent of theoretical oxide weight). Because of the relatively high magnification, a random area was selected on each of the particles. The images were subsequently analyzed using ImageJ image analysis software. Data was obtained by manually measuring the area of individual exposed voids and combining these individual pore area measurements to obtain the total area of voids per image, and then dividing this value by the total field of view area to ultimately obtain the "area percentage covered with porosity" for each of the ten exposed faces and ten mold faces. The percent of the surface area of each face that was occupied by the voids was as follows: exposed face-mean=6.5 percent, standard deviation=1.7 percent; and mold face-mean=0.8 percent, standard deviation=0.4 percent.

Example 18

The exposed face (corresponding to a mold cavity outer opening) and the bottom mold face (opposite the exposed outer face) of ten ceramic shaped abrasive (i.e., fired) particles were independently imaged using a JEOL 7600F field emission scanning electron microscope at 2,000× using backscattered electrons. The particles were prepared according to Example 1, except that the level of peanut oil was 2.5 percent of the weight of aluminum oxide monohydrate (2.9 percent of theoretical oxide weight). Because of the relatively high magnification, a random area was selected on each of the particles. The images were subsequently analyzed using ImageJ image analysis software. Data was obtained by manually measuring the area of individual exposed voids and combining these individual pore area measurements to obtain the total area of voids per image, and then dividing this value by the total field of view area to ultimately obtain the "area percentage covered with porosity" for each of the ten exposed faces and ten mold faces. The percent of the surface area of each face that was occupied by the voids was as follows: exposed face-mean=6.04 percent, standard deviation=2.21 percent; and mold face-mean=0.24 percent, standard deviation=0.18 percent. The mean Feret diameter of voids on the exposed face was 1.57 microns, standard deviation=0.79 micron, and on the mold face it was 1.64 microns, standard deviation=0.72 micron.

Example 19

The exposed face (corresponding to a mold cavity outer opening) and the bottom mold face (opposite the exposed outer face) of ten ceramic shaped abrasive particles (fired) were independently imaged using a JEOL 7600F field emission scanning electron microscope at 2,000× using backscattered electrons. The particles were prepared according to Example 2 (i.e., peanut oil was present in an amount of 0.1 percent of the weight of aluminum oxide monohydrate). Because of the relatively high magnification, a random area was selected on each of the particles. The images were subsequently analyzed using ImageJ image analysis software. Data was obtained by manually measuring the area of individual exposed voids and combining these individual pore area measurements to obtain the total area of voids per image, and then dividing this value by the total field of view area to ultimately obtain the "area percentage covered with porosity" for each of the ten exposed faces and ten mold faces. The percent of the surface area of each face that was occupied by the voids was as follows: exposed face-mean=0.11 percent, standard deviation=0.08 percent; and mold face-mean=0.04 percent, standard deviation=0.04 percent.

Select Embodiments Of The Present Disclosure

In a first embodiment, the present disclosure provides a method of making shaped ceramic precursor particles, the method comprising:

providing a mold having a plurality of mold cavities, wherein each mold cavity is bounded by a plurality of faces joined along common edges;

filling at least some of the mold cavities with a sol-gel composition, the sol-gel composition comprising a liquid vehicle and a ceramic precursor, the liquid vehicle comprising a volatile component and a release agent dispersed throughout the volatile component;

removing at least a portion of the volatile component from the sol-gel composition while the sol-gel composition resides in the mold cavities thereby providing the shaped ceramic precursor particles.

In a second embodiment, the present disclosure provides a method of making shaped ceramic precursor particles according to the first embodiment, further comprising separating the shaped ceramic precursor particles from the mold.

In a third embodiment, the present disclosure provides a method of making ceramic shaped abrasive particles, the method comprising:

making shaped ceramic precursor particles according to the method of the first or second embodiment; and sintering at least a portion of the shaped ceramic precursor particles to provide the ceramic shaped abrasive particles.

In a fourth embodiment, the present disclosure provides a method of making ceramic shaped abrasive particles, the method comprising:

making shaped ceramic precursor particles according to the method of any one of the first to third embodiments;

calcining at least a portion of the shaped ceramic precursor particles of claim 1 to provide calcined shaped ceramic precursor particles; and sintering at least a portion of the calcined shaped ceramic precursor particles to provide the ceramic shaped abrasive particles.

In a fifth embodiment, the present disclosure provides a method according to the third or fourth embodiment, wherein the ceramic shaped abrasive particles comprise alpha alumina In a sixth embodiment, the present disclosure provides a method according to any one of the third to fifth embodiments, wherein the ceramic shaped abrasive particles have an abrasives industry specified nominal grade.

In a seventh embodiment, the present disclosure provides a method according to any one of the third to sixth embodiments, wherein the ceramic shaped abrasive particles have a particle size of less than 5 millimeters.

In an eighth embodiment, the present disclosure provides a method according to any one of the third to the seventh embodiments, wherein the ceramic shaped abrasive particles have a true density of at least 3.8 grams per cubic centimeter.

In a ninth embodiment, the present disclosure provides a method according to any one of the first to eighth embodiments, wherein the release agent comprises an oil.

In a tenth embodiment, the present disclosure provides a method according to any one of the first to ninth embodiments, wherein the release agent is included in the sol-gel composition in an amount of from 0.08 to 4.25 percent of the theoretical oxide weight of the ceramic precursor.

In an eleventh embodiment, the present disclosure provides a method according to any one of the first to tenth embodiments, wherein the ceramic precursor comprises an alpha alumina precursor.

In a twelfth embodiment, the present disclosure provides a sol-gel composition comprising a liquid vehicle and a ceramic precursor, the liquid vehicle comprising a volatile component and oil dispersed throughout the volatile component, wherein the sol-gel composition comprises a sol-gel.

In a thirteenth embodiment, the present disclosure provides a sol-gel composition according to the twelfth embodiment, wherein the release agent comprises an oil.

In a fourteenth embodiment, the present disclosure provides a sol-gel composition according to the twelfth or thirteenth embodiment, wherein the release agent is included in the sol-gel composition in an amount of from 0.08 to 4.25 percent of the theoretical oxide weight of the ceramic precursor.

In a fifteenth embodiment, the present disclosure provides a sol-gel composition according to any one of the twelfth to fourteenth embodiments, wherein the ceramic precursor comprises an alpha alumina precursor.

In a sixteenth embodiment, the present disclosure provides shaped ceramic precursor particles, wherein each shaped ceramic precursor particle comprises a ceramic precursor and is bounded by a surface having a plurality of faces joined along common edges, wherein the surface has voids on at least a portion thereof, wherein the voids are shaped as hollow ellipsoidal sections, wherein the plurality of faces comprises:

an exposed face having a portion of the voids thereon, wherein the exposed face has a first density of the voids; and a mold face that is smaller in area than the exposed face, wherein the mold face has a portion of the voids thereon, wherein the mold face has a second density of the voids, and wherein the first density of the voids is greater than the second density of the voids.

In a seventeenth embodiment, the present disclosure provides ceramic shaped abrasive particles according to the sixteenth embodiment, wherein the exposed face is opposite the mold face.

In an eighteenth embodiment, the present disclosure provides shaped ceramic precursor particles, wherein each shaped ceramic precursor particle comprises a ceramic precursor and is bounded by a surface having a plurality of faces joined along common edges, wherein the surface has voids on at least a portion thereof, wherein the voids are shaped as hollow ellipsoidal sections, wherein the plurality of faces comprises:
  an exposed face having a portion of the voids thereon, wherein the exposed face has a first density of the voids; and
  a mold face, wherein the mold face has a portion of the voids thereon, wherein the mold face has a second density of the voids, and wherein the first density of the voids is greater than the second density of the voids.

In a nineteenth embodiment, the present disclosure provides ceramic shaped abrasive particles according to the eighteenth embodiment, wherein the exposed face is opposite the mold face.

In a twentieth embodiment, the present disclosure provides ceramic shaped abrasive particles, wherein each ceramic shaped abrasive particle comprises a ceramic material and is bounded by a surface having a plurality of faces joined along common edges, wherein the surface has voids on at least a portion thereof, wherein the voids are shaped as hollow ellipsoidal sections, wherein the plurality of faces comprises:
  an exposed face having a portion of the voids thereon, wherein the exposed face has a first density of the voids; and
  a mold face that is smaller in area than the exposed face, wherein the mold face has a portion of the voids thereon, wherein the mold face has a second density of the voids, and wherein the first density of the voids is greater than the second density of the voids.

In a twenty-first embodiment, the present disclosure provides ceramic shaped abrasive particles according to the twentieth embodiment, wherein the exposed face is opposite the mold face.

In a twenty-second embodiment, the present disclosure provides Ceramic shaped abrasive particles, wherein each ceramic shaped abrasive particle comprises a ceramic material and is bounded by a surface having a plurality of faces joined along common edges, wherein the surface has voids on at least a portion thereof, wherein the voids are shaped as hollow ellipsoidal sections, wherein the plurality of faces comprises:
  an exposed face having a portion of the voids thereon, wherein the exposed face has a first density of the voids; and
  a mold face, wherein the mold face has a portion of the voids thereon, wherein the mold face has a second density of the voids, and wherein the first density of the voids is greater than the second density of the voids.

In a twenty-third embodiment, the present disclosure provides shaped ceramic precursor particles according to the twenty-second embodiment, wherein the exposed face is opposite the mold face.

In a twenty-fourth embodiment, the present disclosure provides ceramic shaped abrasive particles according to any one of the twentieth to twenty-third embodiments, wherein the ceramic shaped abrasive particles have an abrasives industry specified nominal grade.

In a twenty-fifth embodiment, the present disclosure provides ceramic shaped abrasive particles according to any one of the twentieth to twenty-fourth embodiments, wherein the ceramic shaped abrasive particles have a particle size less than 5 millimeters.

In a twenty-sixth embodiment, the present disclosure provides ceramic shaped abrasive particles according to any one of the twentieth to twenty-fifth embodiments, wherein the ceramic shaped abrasive particles comprise alpha alumina.

In a twenty-seventh embodiment, the present disclosure provides ceramic shaped abrasive particles according to any one of the twentieth to twenty-sixth embodiments, wherein the ceramic shaped abrasive particles have a true density of at least 3.8 grams per cubic centimeter.

All patents and patents and publications cited hereinabove are incorporated herein by reference, unless specifically excluded. Various modifications and alterations of this disclosure may be made by those skilled in the art without departing from the scope and spirit of this disclosure, and it should be understood that this disclosure is not to be unduly limited to the illustrative embodiments set forth herein.

What is claimed is:

1. A method of making shaped ceramic precursor particles, the method comprising:
  providing a mold having a plurality of mold cavities, wherein each mold cavity is bounded by a plurality of faces joined along common edges;
  filling at least some of the mold cavities with a sol-gel composition, the sol-gel composition comprising a liquid vehicle and a ceramic precursor comprising an alpha alumina precursor, the liquid vehicle comprising a volatile component and a release agent dispersed throughout the volatile component, wherein the release agent comprises an oil; and
  removing at least a portion of the volatile component from the sol-gel composition while the sol-gel composition resides in the mold cavities thereby providing the shaped ceramic precursor particles.

2. The method of claim 1, further comprising separating the shaped ceramic precursor particles from the mold.

3. A method of making ceramic shaped abrasive particles, the method comprising:
  making shaped ceramic precursor particles according to the method of claim 1; and
  sintering at least a portion of the shaped ceramic precursor particles to provide the ceramic shaped abrasive particles.

4. A method of making ceramic shaped abrasive particles, the method comprising:
  making shaped ceramic precursor particles according to the method of claim 1;
  calcining at least a portion of the shaped ceramic precursor particles to provide calcined shaped ceramic precursor particles; and
  sintering at least a portion of the calcined shaped ceramic precursor particles to provide the ceramic shaped abrasive particles.

5. The method of claim 4, wherein the ceramic shaped abrasive particles have an abrasives industry specified nominal grade.

6. The method of claim 4, wherein the release agent is included in the sol-gel composition in an amount of from 0.08 to 4.25 percent of the theoretical oxide weight of the ceramic precursor.

* * * * *

UNITED STATES PATENT AND TRADEMARK OFFICE
CERTIFICATE OF CORRECTION

| | | |
|---|---|---|
| PATENT NO. | : 9,790,410 B2 | Page 1 of 1 |
| APPLICATION NO. | : 14/127853 | |
| DATED | : October 17, 2017 | |
| INVENTOR(S) | : John Boden | |

It is certified that error appears in the above-identified patent and that said Letters Patent is hereby corrected as shown below:

In the Specification

Column 3
Line 45, After "alumina)" insert -- . --.

Column 7
Line 24, After "alumina)" insert -- . --.
Line 30, After "alumina)" insert -- . --.

Column 8
Lines 44-45, Delete "calcining)" and insert -- calcining). --, therefor.

Column 18
Line 4, After "alumina" insert -- . --.
Lines 62-63, Delete "wherein the first density of the voids is greater than the second density of the voids." and insert the same on Column 18, Line 61, as a continuation of the same paragraph.

Signed and Sealed this
Twenty-second Day of May, 2018

Andrei Iancu
*Director of the United States Patent and Trademark Office*